United States Patent [19]

Hegge

[11] 4,158,427

[45] Jun. 19, 1979

[54] DISPENSER FOR PARTICULATE MATERIAL

[76] Inventor: Hiram B. Hegge, Rte. 8, Box 96, Chippewa Falls, Wis. 54729

[21] Appl. No.: 561,070

[22] Filed: Mar. 24, 1975

[51] Int. Cl.² ............................................ G01F 11/24
[52] U.S. Cl. .................................... 222/317; 222/368
[58] Field of Search ............... 222/311, 317, 368, 345; 221/266

[56] References Cited

U.S. PATENT DOCUMENTS

| 183,684 | 10/1876 | Klinkerman | 222/368 X |
| 611,690 | 10/1898 | Ehmke | 222/345 X |
| 995,157 | 6/1911 | Korman | 221/266 |
| 2,046,603 | 7/1936 | Baumgardner | 222/317 |
| 2,286,554 | 6/1942 | Lieberman | 222/317 X |
| 2,743,043 | 4/1956 | Hines et al. | 222/311 |

Primary Examiner—Robert J. Spar
Assistant Examiner—Frederick R. Handren
Attorney, Agent, or Firm—Richard E. Brink

[57] ABSTRACT

Particles of molasses absorbed in diatomaceous earth, blended with powdered additives, are dispensed smoothly, without agglomeration or classification according to particle size, by a gravity-fed dispenser having a slowly rotating paddle wheel at the lower front edge of a hopper having a planar front wall and a steeply sloping bottom.

6 Claims, 3 Drawing Figures

DISPENSER FOR PARTICULATE MATERIAL

BACKGROUND OF THE INVENTION

This invention relates to dispensers for particulate material, having particular utility for use with materials which agglomerate when subjected to shearing or compressive forces.

For the past several centuries, it has been known that moist forage, such as green corn or hay, could be preserved in a succulent state by the exclusion of air, whereby the forage undergoes various chemical changes. In this method of preservation, moist fodder is stored in a silo, fermentation occurring and the crop temperature rising until all the air in the interstices of the silage is exhausted. Even after chopping, the plant cells of fresh green crops continue to take in oxygen from the air and to give off carbon dioxide which replaces the oxygen in the air. During fermentation, anaerobic bacteria convert the sugars, starches, etc. into lactic, acetic, and other acids.

Crops with a low content of protein and calcium, such as corn, sorghums, and small cereal grains, will develop enough acid to make them good silage. Crops with a high content of protein and calcium, such as the legumes or immature grasses, should have molasses or acid added. Although silage is an easy form in which to feed forage to livestock, most silage has a low mineral and protein content, and is not suitable for use as a ration. It has been conventional for many years to supplement silage by adding molasses at the time the chopped forage is transported to the silo for storage. The process may involve the periodic addition of liquid molasses after a certain amount of silage has been stored, but it is both difficult and imprecise. There does not seem to be any particularly good way of dispensing liquid molasses to silage, because slight changes in viscosity affect the rate of dispensing, and nozzles have a decided tendency to become clogged wih sticky materials, often further complicated by the inclusion of dust.

A recent development provides for absorbing liquid molasses into diatomaceous earth, forming small free-flowing particles up to about 300 mils in diameter, the product having a bulk density of about 40 lbs./ft.$^3$. This product and the method of making it are described in U.S. Pat. No. 3,859,448. Such particles would seem to lend themselves to being dispensed somewhat more controllably than liquid molasses. Unfortunately, however, the nature of the individual particles of so-called "encapsulated molasses" is such that conventional methods of handling particulate material are not satisfactory. For example, a dispensing hopper having an attached vibrator (a device often employed with dry particulate material) literally shakes the molasses out of the capsules. Similarly, an auger develops a shearing or compression action which expresses the molasses from the original dry particles and gums up the equipment. Attempting to meter the particles through sieve-like plates is similarly ineffective. The same type of result occurs if an attempt is made to dispense the particles through a mechanism such as that employed in a lawn fertilizer spreader. In fact, any dispensing technique based on the use of a paddle wheel which passes closely adjacent to another surface has tended to break down such particles.

Encapsulated molasses can be blended with selected powder amino acids, trace elements, and other additives to provide a "pro-biotic" supplement suited for any given type of forage to promote said rapid fermentation and optimize the food value of the resultant silage. Because the specific additives are tailored to the nature of the forage, while the molasses remains constant, it is considered practical to simply add the requisite powdered elements to the pre-encapsulated molasses and dispense the mixture. Thus, it is not practical to employ a peripherally corrugated roll, since the corrugations tend to cause particles and powders to be classified into different sizes, the powders being dispensed first and rendering the composition of the dispensed supplement inconsistent.

In short, prior to the present invention, there has not been a commercially acceptable method of dispensing "encapsulated molasses" into silage.

SUMMARY

The present invention provides a deceptively simple way of dispensing "encapsulated molasses" and other materials of the type which tend to agglomerate when subjected to shearing action. The device, which functions in an extremely effective manner, operates smoothly, is closely controllable, does not classify particles by size, and is inexpensive both to construct and to operate.

The invention provides a hopper having a generally planar front wall containing a generally rectangular opening in a lower portion. A floor slopes downwardly and forwardly from the rear of the hopper to a line parallel to the front wall and spaced to the rear of the opening, thereafter bending forward in a smooth curve to terminate at the lower edge of the opening. Rotatably mounted in the hopper is a paddle wheel-type impeller having a horizontally disposed shaft in a plane parallel to the front wall and behind the opening. A motor slowly rotates the impeller in a direction such that the paddles move from top to bottom when viewed from the outside of the opening. Because of the specific conformation of the structure, no shearing action occurs, and encapsulated molasses particles are not caused to agglomerate by operation of the device.

BRIEF DESCRIPTION OF THE DRAWINGS

Understanding of the invention will be facilitated by reference to the accompanying drawing, in which like numbers refer to like parts in the several views and in which.

DESCRIPTION OF PRESENTLY PREFERRED EMBODIMENTS

Figure 1:
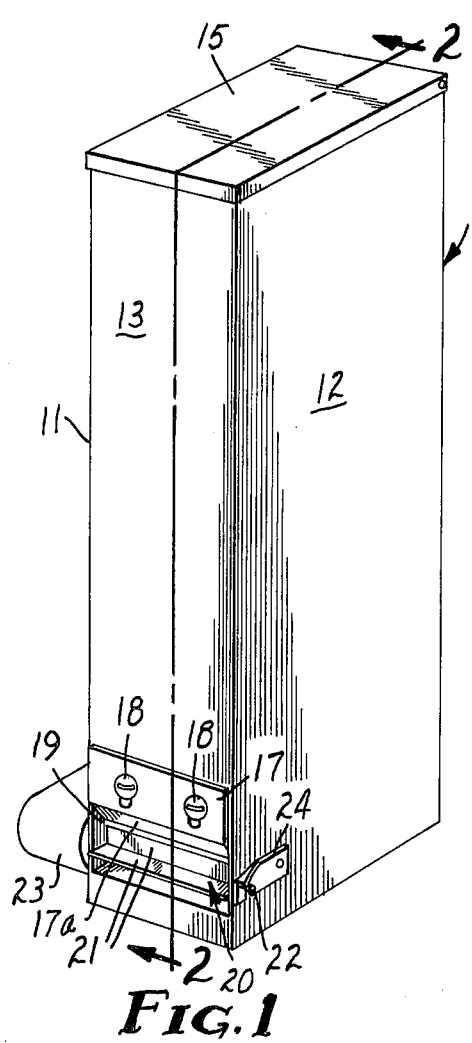
FIG. 1 is a perspective view of a dispenser made in accordance with the invention.
Figure 3:
FIG. 3 is a perspective view of the impeller for the device of FIGS. 1 and 2.
Figure 2:
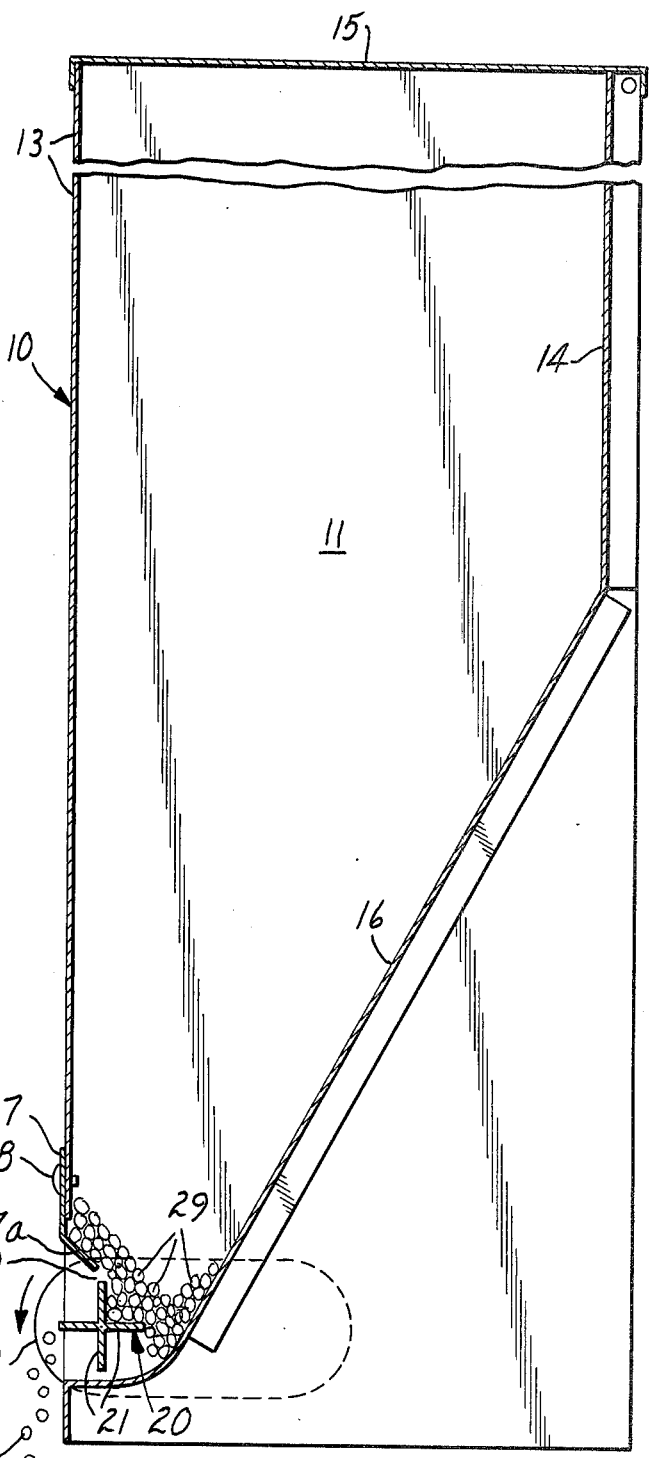
FIG. 2 is a cross-sectional view of the dispenser of FIG. 1, taken along section line 2—2 and looking in the direction of the arrows, the device being shown in dispensing operation.

Understanding of the invention will be further assisted by reference to the following description of an illustrative but non-limiting embodiment of the invention.

Dispenser 10 is a hopper-like structure having, as viewed from the front, left side wall 11, right side wall 12, rear wall 14, and front wall 13. Hinged to frame members at the back of rear wall 14 is cover 15. Located within the hopper is sloping floor 16, which constitutes a sort of false bottom extending from an upper portion of rear wall 14 downwardly toward the base of front wall 13. Although the exact dimensions are not critical, dispenser 10 may be 18 inches high, 4 inches wide and 7 inches deep.

Located at a lower portion of front wall 13 is generally rectangular opening 19, extending from left side wall 11 to right side wall 12. The forward portion of floor 16 bends forward in a smooth curve at a line to the rear of opening 19, terminating in a horizontal portion at the lower edge of opening 19. A stub portion of front wall 13, preferably in the form of lift gate 17, is slidably attached to the upper portion of front wall 13 by means of screws 18. A lower portion of lift gate 17 extends rearwardly into the hopper, forming angularly disposed distal portion 17a.

Positioned within the hopper, to the rear of opening 19 is impeller 20. The location of impeller 20 is sufficiently higher than the horizontal portion of floor 16 and sufficiently spaced from the edge of distal portion 17a of lift gate 17, that no shearing action occurs; generally speaking, this distance should be at least about 50-100 mils. Impeller 20 may be of extremely simple construction, comprising paddles 21, having stub shaft 22 affixed to one end thereof and extending through side wall 12, where it is rotatably supported in predetermined position by means of notched latch 24. The left end of impeller 20 is adapted to be attached to a driving means, such as a small electric motor, the exact nature of which is not shown but which is indicated generally by numeral 23. Because very little power is required to drive impeller 20, it has been found that a simple and inexpensive motor, driven by an ordinary "D" dry cell, is satisfactory. If desired, however, a variable speed motor may be employed for greater versatility.

In operation, the dispenser is filled with encapsulated molasses 29 and positioned over a conveyor transporting freshly chopped silage 30, and motor 23 engaged in a manner such that impeller 20 will be rotated at a slow speed. Where there are four impeller paddles 21, each having a radial length of one-half inch, it has been found satisfactory to rotate impeller 20 at 4–16 rpm. When the axial length of impeller 20 is 4 inches and the radial length of each impeller paddle 21 is one-half inch, rotating impeller 20 at 5 rpm typically dispenses about 40 lbs. of particles 29 per hour. Decreasing the radial length of paddles 21 or reducing the speed of rotation of impeller 20 causes a lesser rate of dispensing. Generally speaking, however, the radial length of paddles 21 should be at least about ¼ inch to avoid the previously discussed problems of shearing, compression and classification by particle size.

The direction in which impeller 20 rotates is such that, when viewed from outside opening 19, paddles 21 move from top to bottom. This method of rotation serves to loosen particles 29 and facilitate dispensing; rotation in the opposite direction tends to cause a shearing action, with resultant compaction, rupture, and agglomeration of the particles.

For most effective operation, the most forward plane intersected by the radially outer edge of paddles 20 during rotation should be coplanar with, or preferably slightly forward of, the plane in which front wall 13 lies. Alternatively, the portion of front wall 13 lying below opening 19 may be located to the rear of the portion lying above opening 19. In any event, dispensed particles 29 should be able to fall freely onto silage 30.

The edge of distal portion 17a of lift gate 17 should extend approximately over the axis of rotation of impeller 20, still further minimizing any possibility of particle rupture. It has been found that the radial length of paddles 21 should be slightly less than the distance from the axis of rotation to distal portion 17a of lift gate 17 to insure that there is at least about 50 mils clearance between the edge of distal portion 17a and the circle transcribed by rotating paddles 21. Increasing the clearance increases the rate at which particles 29 are dispensed.

The foregoing description is purely illustrative in nature, and variations will readily occur to those skilled in the art. For example, while a four-paddle impeller has been shown, impellers having either fewer or more paddles may also be employed. Likewise, the specific contours and dimensions of the hopper may be changed. The angle of sloping floor 16 may also be varied, but it is desirable that it be at least 60° to the horizontal in order to insure that particles 29 will flow evenly downward under the influence of gravity.

What is claimed is as follows:

1. A dispenser for particulate material which becomes sticky and agglomerates when subjected to shearing forces, comprising in combination:
    an enclosed hopper having a generally planar front wall, a generally rectangular opening in a lower portion of said front wall, a floor sloping downwardly and forwardly at an angle of at least about 60° to the horizontal, extending from the rear of said hopper to a line parallel to said front wall and spaced rearwardly of said opening, said floor then bending forward in a smooth curve to a substantially horizontal plane and terminating at the lower edge of said opening, a stub portion of said front wall, constituting a vertically adjustable lift gate, extending downwardly and rearwardly a short distance into the hopper from the upper edge of said opening and terminating in a distal edge,
    rotatably mounted in said hopper, an impeller having a horizontally disposed shaft in a plane parallel to said front wall, said impeller being positioned below the distal edge of said stub portion, above the floor and forward of the lower edge of said opening, a plurality of paddles extending generally radially from said shaft along substantially the entire width of the hopper, the the radial length of said paddles being such as to slightly clear the distal edge of said stub portion, and means for slowly rotating said impeller in a direction such that said paddles move from top to bottom when viewed from the outside of said opening.

2. The dispenser of claim 1 wherein the most forward plane intersected by the radially outer edge of the paddles is slightly forward of said front wall.

3. The dispenser of claim 2 wherein a horizontal cross-section of the hopper is rectangular.

4. The dispenser of claim 3 wherein the impeller has four paddles.

5. The dispenser of claim 4 wherein the radial length of each paddle is approximately ½ inch.

6. The dispenser of claim 5 wherein the means for rotating said impeller drives it at a speed of approximately 5 rpm.

* * * * *